US009572024B2

(12) United States Patent
Guan

(10) Patent No.: US 9,572,024 B2
(45) Date of Patent: Feb. 14, 2017

(54) NETWORK UPGRADING-ADAPTIVE TELEPHONE NUMBER UPGRADING METHOD AND DEVICE FOR WIRELESS TERMINAL

(71) Applicant: ZTE CORPORATION, Shenzhen (CN)

(72) Inventor: Zhaoxu Guan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 100 days.

(21) Appl. No.: 14/401,973

(22) PCT Filed: Dec. 27, 2012

(86) PCT No.: PCT/CN2012/087733
§ 371 (c)(1),
(2) Date: Nov. 18, 2014

(87) PCT Pub. No.: WO2013/170612
PCT Pub. Date: Nov. 21, 2013

(65) Prior Publication Data
US 2015/0156628 A1 Jun. 4, 2015

(30) Foreign Application Priority Data

May 18, 2012 (CN) .......................... 2012 1 0156117

(51) Int. Cl.
*H04W 8/28* (2009.01)
*H04M 3/42* (2006.01)
(52) U.S. Cl.
CPC ............ *H04W 8/28* (2013.01); *H04M 3/4228* (2013.01); *H04Q 2213/13097* (2013.01); *H04Q 2213/13102* (2013.01)
(58) Field of Classification Search
CPC .............................................. H04M 1/274516
(Continued)

(56) References Cited

U.S. PATENT DOCUMENTS 6,959,192 B1 * 10/2005 Cannon ................. H04W 8/205
455/414.1
2004/0204117 A1 * 10/2004 Weiner ............ H04M 1/274516
455/564
(Continued)

FOREIGN PATENT DOCUMENTS

CN 1249112 A 3/2000
CN 1284820 A * 2/2001 ............... G06F 8/65
(Continued)

OTHER PUBLICATIONS

International Search Report for corresponding application PCT/CN2012/087733 filed Dec. 27, 2012; Mail date Apr. 4, 2013.
(Continued)

*Primary Examiner* — Lester Kincaid
*Assistant Examiner* — Gary Lafontant
(74) *Attorney, Agent, or Firm* — Cantor Colburn LLP

(57) ABSTRACT

A network upgrading-adaptive telephone number upgrading method and device for a wireless terminal are provided. The solution relates to the field of wireless communication. An initialization unit of a terminal device acquires telephone numbers to be upgraded, and backs up the telephone numbers for use during recovery of the telephone numbers; the initialization unit of the terminal device acquires storage positions where the telephone numbers to be upgraded are stored; a number upgrading unit of the terminal device acquires number upgrading rules from a network side through the wireless terminal, and upgrades the telephone numbers in the storage positions according to the number upgrading rules; and a number writing unit of the terminal device covers the telephone numbers in the storage positions with the upgraded telephone numbers. The problem that the telephone numbers of the wireless terminal or the terminal device cannot be adaptively upgraded after a network is upgraded is solved, and beneficial effects of adaptively
(Continued)

upgrading the telephone numbers, improving user experiences and reducing a risk after the network upgrading of an operator are achieved.

10 Claims, 3 Drawing Sheets

(58) Field of Classification Search
USPC ............... 455/564, 456.3, 433, 419; 713/168
See application file for complete search history.

(56) References Cited

U.S. PATENT DOCUMENTS

| | | | |
|---|---|---|---|
| 2009/0176486 A1* | 7/2009 | Jung | ............... H04M 1/274516 |
| | | | 455/419 |
| 2010/0190493 A1* | 7/2010 | Zoeckler | ................. H04W 8/26 |
| | | | 455/433 |
| 2012/0036361 A1* | 2/2012 | Tyhurst | ................... H04L 67/34 |
| | | | 713/168 |

FOREIGN PATENT DOCUMENTS

| | | | |
|---|---|---|---|
| CN | 1780292 A | 5/2006 |
| CN | 102711090 A | 10/2012 |
| GB | 2357011 A | 6/2001 |
| WO | 9838820 A2 | 9/1998 |

OTHER PUBLICATIONS

European Search Report for corresponding application EP 12 87 7061: Report dated May 29, 2015.

\* cited by examiner

NETWORK UPGRADING-ADAPTIVE TELEPHONE NUMBER UPGRADING METHOD AND DEVICE FOR WIRELESS TERMINAL

TECHNICAL FIELD

The disclosure relates to the field of wireless communication, in particular to a network upgrading-adaptive telephone number upgrading method and device for a wireless terminal.

BACKGROUND

Along with the continuous development of a wireless mobile communication technology, operators pay more and more attention to whether an original data service can be adapted to an upgraded network or not. Voice communication is the most important widely-used service, which inevitably causes the problem whether the network can be compatible with an original telephone number or not after being upgraded. If the network cannot be compatible with the original telephone number after being upgraded, it is necessary to consider whether the telephone number can be automatically upgraded according to network number upgrading rules or not.

At present, wireless data terminal service does not take such a condition into account, and different software services are often provided according to network upgrading rules of different operators, so that good user experiences cannot be provided, increasing requirements of a communication network cannot be met, and abilities of the operators in quickly responding to the market are further influenced.

SUMMARY

The embodiments of the disclosure provide a network upgrading-adaptive telephone number upgrading method and device for a wireless terminal, which can better solve the problem that a telephone number of the wireless terminal cannot be adaptively upgraded after a network is upgraded.

According to one embodiment of the disclosure, a network upgrading-adaptive telephone number upgrading method for a wireless terminal is provided, including that:

an initialization unit of a terminal device acquires telephone numbers to be upgraded, and backs up the telephone numbers for use during the recovery of the telephone numbers;

the initialization unit of the terminal device acquires storage positions where the telephone numbers to be upgraded are stored;

a number upgrading unit of the terminal device acquires number upgrading rules from a network side through the wireless terminal, and upgrades the telephone numbers in the storage positions according to the number upgrading rules; and a number writing unit of the terminal device covers the telephone numbers in the storage positions with the upgraded telephone numbers.

In the described embodiment, the wireless terminal acquiring the number upgrading rules from the network side includes that:

the wireless terminal acquires the number upgrading rules from the network side by accessing a cloud or through a Subscriber Identity Module Card Took Kit (STK).

In the described embodiment, after the initialization unit of the terminal device acquires the storage positions of the telephone numbers, the method further includes that:

a number backup unit of the terminal device backs up the acquired telephone numbers, wherein a backup file of the telephone numbers is named after backup time and a storage position of the backup file.

In the described embodiment, after the number writing unit of the terminal device stores the upgraded telephone numbers in the corresponding storage positions, the method further includes that:

a number searching unit of the terminal device searches for the corresponding backup file according to the backup time;

the number backup unit of the terminal device deletes the telephone numbers in the corresponding storage positions; and the number writing unit of the terminal device covers the telephone numbers in the storage positions with the telephone numbers in the backup file.

In the described embodiment, the number upgrading rules include offset before upgrading, an offset content before upgrading, offset after upgrading and an offset content after upgrading.

In the described embodiment, the telephone numbers to be upgraded are stored in the terminal device or a Subscriber Identity Module/Universal Subscriber Identity Module (SIM/USIM) card of the wireless terminal.

According to another embodiment of the disclosure, a network upgrading-adaptive telephone number upgrading device for a wireless terminal is provided, wherein an operator stores network upgrading rules at a network side after a network is upgraded, and the device includes the following units arranged on a terminal device:

an initialization unit, configured to acquire telephone numbers to be upgraded, back up the telephone numbers for use during the recovery of the telephone numbers and acquire storage positions where the telephone numbers to be upgraded are stored;

a number upgrading unit, configured to acquire number upgrading rules from the network side through the wireless terminal, and upgrade the telephone numbers in the storage positions according to the number upgrading rules; and a number writing unit, configured to cover the telephone numbers in the storage positions with the upgraded telephone numbers.

In the described embodiment, the number upgrading unit is further configured to acquire the number upgrading rules from the network side by accessing a cloud through the wireless terminal or through an STK.

In the described embodiment, the terminal device further includes:

a number backup unit, configured to back up the acquired telephone numbers, wherein a backup file of the telephone numbers is named after backup time and a storage position of the backup file.

In the described embodiment, the terminal device further includes:

a number searching unit, configured to search for a corresponding backup file according to the backup time; and a number recovery unit, configured to delete the telephone numbers in the corresponding storage positions and cover the telephone numbers in the storage positions with the telephone numbers in the found backup file through the number writing unit.

Compared with the related art, convenience is brought to telephone number upgrading management after the network of the operator is upgraded, user experiences are improved, and a risk after the network of the operator is upgraded is lowered.

DETAILED DESCRIPTION OF THE EMBODIMENTS

The exemplary embodiments of the disclosure are described below with reference to the drawings in detail, and it should be understood that the exemplary embodiments described below are only adopted to describe and explain the disclosure and not intended to limit the disclosure.

Figure 1:
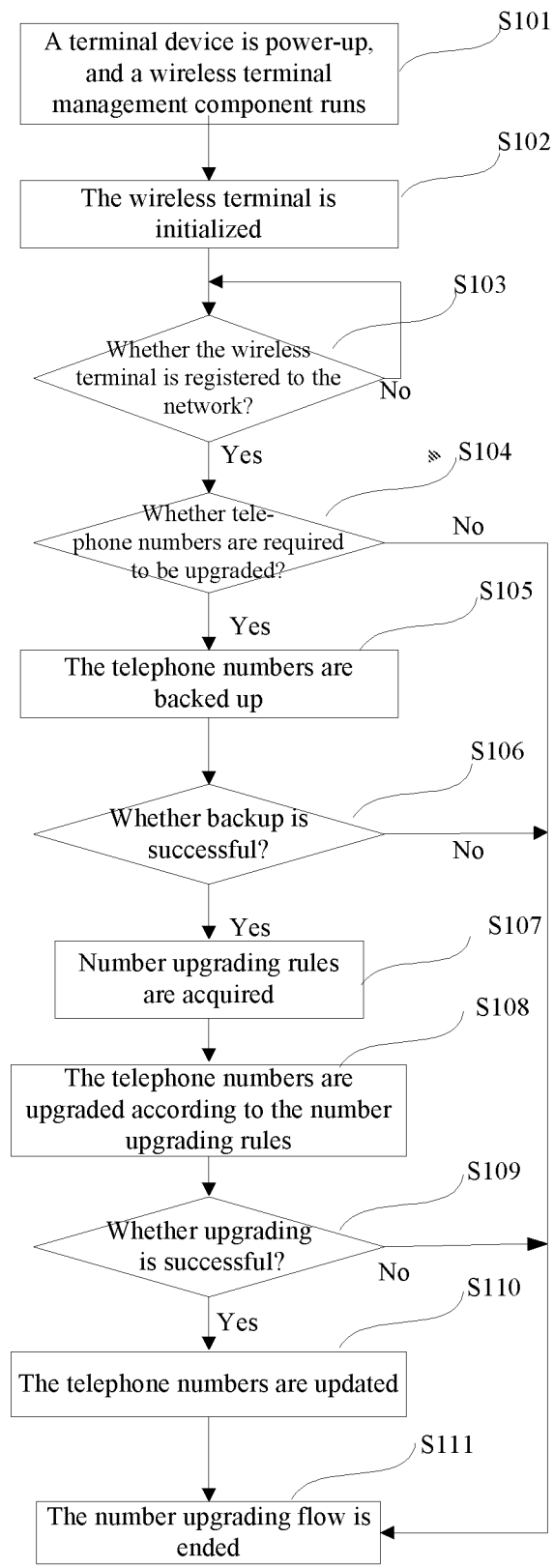
FIG. 1 is a flowchart of a network upgrading-adaptive telephone number upgrading method for a wireless terminal provided by an embodiment of the disclosure.

FIG. 1 is a flowchart of a network upgrading-adaptive telephone number upgrading method for a wireless terminal provided by an embodiment of the disclosure. After a network is upgraded, an operator stores network upgrading rules on a cloud or bundles the network upgrading rules through an STK service, so that a wireless terminal management component of the wireless terminal can acquire the network upgrading rules through the cloud or an STK, wherein the network upgrading rules include four parts: "offset before upgrading", "offset content before upgrading", "offset after upgrading" and "offset content after upgrading". The embodiment takes a wireless Universal Serial Bus (USB) modulator demodulator and a SIM/USIM card as an example, and as shown in FIG. 1, the flow includes the following steps that:

S101: a terminal device is power-up, and the wireless terminal management component runs.

The wireless USB modulator demodulator is plugged into the terminal device, the terminal device is power-up, and the wireless terminal management component starts running. Wherein the terminal device includes equipment such as a Personal Computer (PC) or a notebook computer, the SIM/USIM card is placed in the wireless USB modulator demodulator, and the wireless USB modulator demodulator functions in reading information from the SIM/USIM card, receiving a signal from a base station and performing dialup access, thereby realizing connection to a wireless network.

The wireless terminal management component is a human-computer interaction interface installed on the terminal device, and communicates with the wireless terminal through a serial port. Wherein the wireless terminal includes a USB modulator demodulator, a wireless data card and the like, and the wireless USB modulator demodulator is adopted in the embodiment. The wireless terminal management component mainly functions in registering to the current wireless network through the wireless terminal and acquiring upgrading rules of the current network, thereby upgrading telephone numbers stored in the terminal device or the SIM/USIM card. The wireless terminal management component includes an initialization unit, a number backup unit, a number upgrading unit, a number searching unit, a number recovery unit and a number writing unit.

S102: the wireless terminal is initialized.

The initialization unit starts an initialization flow for the initialization of the wireless terminal, specifically including initialization of the serial port, reading of the wireless USB modulator demodulator and a network state, reading of the telephone numbers in the SIM/USIM card, acquisition of storage positions of the telephone numbers to be upgraded and the like.

S103: whether the wireless terminal is registered to the network or not is judged.

The wireless terminal management component judges whether the wireless terminal is registered to the network or not, continues executing S103 if the wireless terminal is not registered to the network, otherwise acquires a current network registration state, and executes S104.

S104: whether a user is required to upgrade the telephone numbers or not is judged.

The wireless terminal management component prompts the wireless terminal user whether to upgrade the telephone numbers or not after detecting that the network is upgraded, executes S105 if the wireless terminal user selects to upgrade the telephone numbers, otherwise executes S111.

S105: the telephone numbers are backed up.

In case of successful network registration, if the user requires number upgrading, the number backup unit backs up all the telephone numbers read from the SIM/USIM card during the initialization, and a backup file is named after "position+time", wherein "position" refers to a position selected by the user for the storage of the backup file, and "time" refers to current backup time.

S106: whether backup is successful or not is judged.

The wireless terminal management component judges whether the telephone numbers are successfully backed up or not, executes S107 if the telephone numbers are successfully backed up, otherwise executes S111.

S107: number upgrading rules are acquired.

The wireless terminal management component communicates with the wireless terminal through the serial port. The wireless terminal management component communicates with the wireless terminal under the support of a serial port communication protocol including a standard Attention (AT) instruction specified by a $3^{rd}$ Generation Partnership Project (3GPP) protocol. The AT instruction is adopted to read or write the telephone numbers of the SIM/USIM card and acquire the upgrading rules of the current network.

After successful backup, the number upgrading unit acquires the number upgrading rules of the current network by accessing the cloud through the wireless terminal or through the STK, wherein the upgrading rules are in a format of "offset before upgrading", "offset content before upgrading", "offset after upgrading" and "offset content after upgrading". Specifically, the number upgrading unit expands an instruction according to "AT+instruction name?", and transmits the instruction to the wireless terminal to acquire the number upgrading rules of the current network, and a result parameter returned by the wireless terminal is ("offset before upgrading", "offset content before upgrading", "offset after upgrading" and "offset content after upgrading"), wherein "offset before upgrading" represents the positions of the numbers before upgrading, the "offset content before upgrading" represents number contents under the offset before upgrading, the "offset after upgrading" represents the positions of the numbers after upgrading, and the "offset content after upgrading" represents the number contents under the offset after the upgrading of the numbers.

S108: the telephone numbers are upgraded according to the number upgrading rules.

The number upgrading unit upgrades all the telephone numbers consistent with the upgrading rules in the storage positions in the SIM/USIM card in batches according to the acquired number upgrading rules. For example, a telephone number 8615212345678 to be upgraded is required to be upgraded by modifying 86 into 396, the offset before upgrading is 0, the offset content before upgrading is 86, the offset after upgrading is 0, the offset content after upgrading is 396, and the telephone number can be adaptively upgraded to be 39615212345678 according to the four number upgrading rules.

S109: whether upgrading is successful or not is judged.

The wireless terminal management component judges whether the telephone numbers are successfully upgraded or not, executes S110 if the telephone numbers are successfully upgraded, otherwise executes S111.

S110: the telephone numbers are updated.

The wireless terminal management component transmits the AT instruction to the wireless terminal, and the number upgrading unit writes the upgraded new telephone numbers into the corresponding storage positions in the SIM/USIM card in batches to cover all the original telephone numbers consistent with the upgrading rules in the storage positions in the SIM/USIM card.

S111: the number upgrading flow is ended.

If the user selects to upgrade telephone numbers in the terminal device, i.e. the PC or the notebook computer, the wireless terminal management component reads the telephone numbers from the PC or the notebook computer, backs up and upgrades the read telephone numbers according to the number upgrading rules acquired from the network side, and stores the upgraded telephone numbers in the corresponding storage positions in the PC or the notebook computer. When the telephone numbers are recovered, the telephone numbers in the backup file are read, and the read telephone numbers are rewritten into the corresponding storage positions in the PC or the notebook computer. In a word, the flow of upgrading the telephone numbers in the PC or the notebook computer is similar to that of upgrading the telephone numbers in the SIM/USIM card, and an only difference is where the telephone numbers are read and stored.

Figure 2:
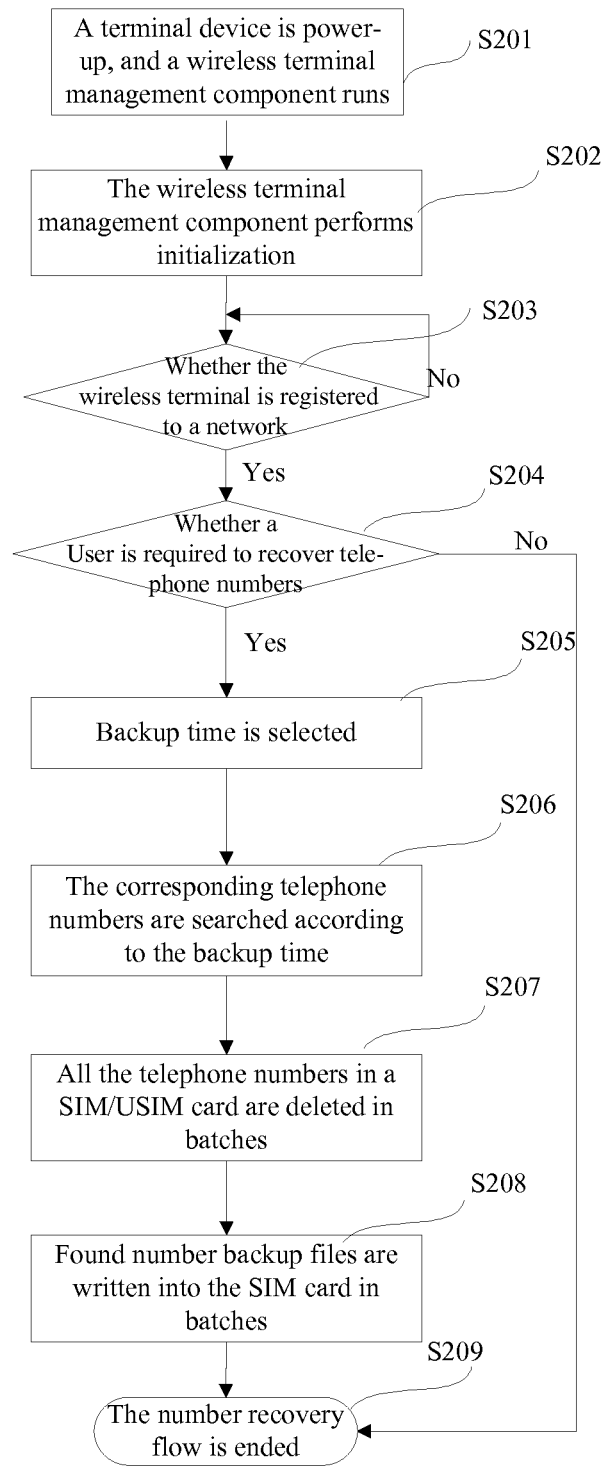
FIG. 2 is a flowchart of a network upgrading-adaptive telephone number recovery method for a wireless terminal provided by an embodiment of the disclosure.

FIG. 2 is a flowchart of a network upgrading-adaptive telephone number recovering method for a wireless terminal provided by an embodiment of the disclosure, and as shown in FIG. 2, the flow includes the following steps that:

S201: a terminal device is power-up, and a wireless terminal management component runs.

S202: the wireless terminal management component performs initialization.

An initialization unit starts an initialization flow for the initialization of the wireless terminal, specifically including initialization of a serial port, reading of a wireless USB modulator demodulator and a network state, reading of telephone numbers in a SIM/USIM card and the like.

S203: whether the wireless terminal is registered to a network or not is judged.

The wireless terminal management component judges whether the wireless terminal is registered to the network or not, continues executing S203 if the wireless terminal is not registered to the network, otherwise executes S204.

S204: whether a user is required to recover the telephone numbers or not is judged.

The wireless terminal management component prompts the user whether to recover the telephone numbers or not, executes S205 if the user selects to recover the telephone numbers, otherwise executes S209.

S205: backup time is selected.

The wireless terminal management component prompts the user to input or select the backup time.

S206: the corresponding telephone numbers are searched according to the backup time.

A number searching unit searches all backup files for backup files consistent with the backup time according to the backup time input or selected by the user.

S207: all the telephone numbers in the SIM/USIM card are deleted in batches.

The wireless terminal management component transmits an AT deletion instruction to the serial port to delete all the telephone numbers in the SIM/USIM card in batches.

S208: the found number backup files are written into the SIM card in batches.

A number writing unit transmits an AT writing instruction to the serial port to write the found telephone numbers into the corresponding storage positions in the SIM/USIM card in batches.

S209: the number recovery flow is ended.

Figure 3:
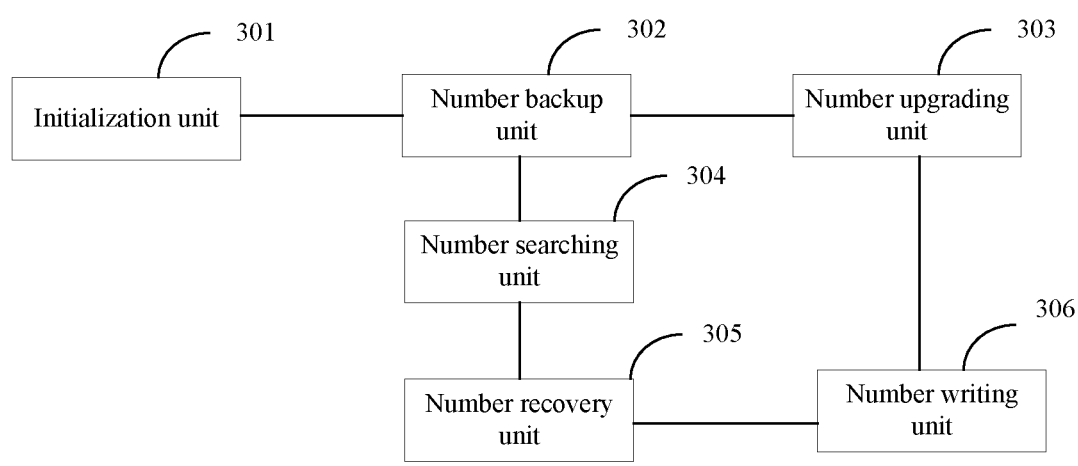
FIG. 3 is a structure diagram of a network upgrading-adaptive telephone number upgrading terminal device for a wireless terminal provided by an embodiment of the disclosure.

FIG. 3 is a structure diagram of a network upgrading-adaptive telephone number upgrading terminal device for a wireless terminal provided by an embodiment of the disclosure. The terminal device includes equipment such as a PC or a notebook computer, and is connected with the wireless terminal through a serial port, wherein the wireless terminal is a wireless USB modulator demodulator, a wireless data card or the like. If the wireless terminal is the wireless USB modulator demodulator, a SIM/USIM card is plugged into the wireless USB modulator demodulator. The wireless USB modulator demodulator functions in reading information from the SIM/USIM card, receiving a signal from a base station and performing dialup access, thereby realizing connection to a wireless network. As shown in FIG. 3, the terminal device includes the following units arranged thereon: an initialization unit 301, a number backup unit 302, a number upgrading unit 303, a number searching unit 304, a number recovery unit 305 and a number writing unit 306.

The initialization unit 301 is configured to acquire telephone numbers to be upgraded, back up the telephone numbers for use during the recovery of the telephone numbers and acquire storage positions where the telephone numbers to be upgraded are stored. Specifically, the initialization unit 301 is configured to initialize the wireless terminal, read a network registration state and read the telephone numbers from the SIM/USIM card or a terminal device side.

The number upgrading unit 303 is configured to acquire number upgrading rules from a network side through the wireless terminal and upgrade the telephone numbers in the storage positions according to the number upgrading rules. The number upgrading unit acquires the number upgrading rules from the network side by accessing a cloud through the wireless terminal or through an STK, and upgrades the telephone numbers in the storage positions according to the upgrading rules fed back by the wireless terminal.

The number writing unit 306 is configured to cover the telephone numbers in the storage positions with the upgraded telephone numbers. After the numbers are successfully upgraded, the number writing unit 306 rewrites the upgraded telephone numbers to the corresponding storage positions, and is also configured to rewrite the backed-up numbers to the corresponding storage positions. Specifically, when the storage positions selected by a user are in the terminal device side, all the telephone numbers in the terminal device side are deleted; in case of recovery operation, the telephone numbers in the storage positions in the terminal device side are covered by all the telephone numbers in a backup file found by the number searching unit 304; and in case of number upgrading operation, the telephone numbers upgraded by the number upgrading unit 303 are rewritten to the terminal device side. If the storage positions selected by the user are in a SIM/USIM side, an AT instruction is transmitted to delete all the telephone numbers in the SIM/USIM card; in case of upgrading operation, all the telephone numbers upgraded by the number upgrading unit 303 are written into the SIM/USIM card through the AT instruction; and in case of recovery operation, all the telephone numbers in the backup file found by the number searching unit 304 are rewritten into the SIM/USIM card.

The number backup unit 302 is configured to back up the acquired telephone numbers, wherein the backup file of the telephone numbers is named after backup time and a storage position of the backup file. Specifically, the number backup unit 302 automatically backs up the corresponding telephone numbers according to the storage positions selected by the user and current storage time.

The number searching unit 304 is configured to search the corresponding backup file according to the backup time or a backup time period.

The number recovery unit 305 is configured to delete the telephone numbers in the corresponding storage positions and cover the telephone numbers in the storage positions with the telephone numbers in the backup file found by the number writing unit. The number recovery unit 305 calls the number searching unit 304 to search the corresponding backup file according to the time period selected by the user, and calls the number writing unit 306 to write the found backup file in the corresponding storage position.

From the above, according to the embodiment of the disclosure, the telephone numbers are adaptively upgraded according to upgrading rules of different networks, and the embodiment of the disclosure can be adapted to the continuous upgrading of the networks as well as the upgrading of different networks of different operators, so that the problem that changes in the telephone number upgrading rules inevitably cause changes in wireless terminal software in conventional customization is solved, an intelligence effect of automatically upgrading the telephone numbers according to different upgrading rules of different networks is achieved, and meanwhile, the risk after the network upgrading of the operator is greatly reduced.

The above is not intended to limit the disclosure, although describing the embodiment of the disclosure in detail, and those skilled in the art can make various modifications according to the principle described by the embodiment of the disclosure. Therefore, these modifications made according to the principle described by the embodiment of the disclosure shall fall within the scope of protection as defined by the appended claims of the disclosure.

What is claimed is:

1. A network upgrading-adaptive telephone number upgrading method for a wireless terminal, wherein an operator stores network upgrading rules at a network side after a network is upgraded, and the method comprises:
    acquiring, by an initialization unit of a terminal device, telephone numbers to be upgraded, and backing up the telephone numbers to be upgraded for use during recovery of the telephone numbers;
    acquiring, by the initialization unit of the terminal device, storage positions where the telephone numbers to be upgraded are stored;
    acquiring, by a number upgrading unit of the terminal device, number upgrading rules from the network side through the wireless terminal, and upgrading the telephone numbers in the storage positions according to the number upgrading rules; and
    covering, by a number writing unit of the terminal device, the telephone numbers in the storage positions with the upgraded telephone numbers.

2. The method according to claim 1, wherein acquiring, by the wireless terminal, the number upgrading rules from the network side comprises:
    acquiring, by the wireless terminal, the number upgrading rules from the network side by accessing a cloud or through a Subscriber Identity Module Card Took Kit (STK).

3. The method according to claim 1, wherein after acquiring, by the initialization unit of the terminal device, the storage positions of the telephone numbers, the method further comprises:
    backing up, by a number backup unit of the terminal device, the acquired telephone numbers, wherein a backup file of the telephone numbers is named after backup time and a storage position of the backup file.

4. The method according to claim 3, wherein after storing, by the number writing unit of the terminal device, the upgraded telephone numbers in the corresponding storage positions, the method further comprises:
    searching, by a number searching unit of the terminal device, for the corresponding backup file according to the backup time;
    deleting, by the number backup unit of the terminal device, the telephone numbers in the corresponding storage positions; and
    covering, by the number writing unit of the terminal device, the telephone numbers in the storage positions with the telephone numbers in the backup file.

5. The method according to claim 2, wherein the number upgrading rules comprise offset before upgrading, an offset content before upgrading, offset after upgrading and an offset content after upgrading.

6. The method according to claim 1, wherein the telephone numbers to be upgraded are stored in the terminal device or a Subscriber Identity Module/Universal Subscriber Identity Module (SIM/USIM) card of the wireless terminal.

7. A network upgrading-adaptive telephone number upgrading terminal device for a wireless terminal, wherein an operator stores network upgrading rules at a network side after a network is upgraded, the terminal device comprises a processor, which is coupled with a memory and configured to execute program units stored on the memory, wherein the program units comprise:
    an initialization unit, configured to acquire telephone numbers to be upgraded, back up the telephone numbers for use during recovery of the telephone numbers and acquire storage positions where the telephone numbers to be upgraded are stored;
    a number upgrading unit, configured to acquire number upgrading rules from the network side through the wireless terminal, and upgrade the telephone numbers in the storage positions according to the number upgrading rules; and a number writing unit, configured to cover the telephone numbers in the storage positions with the upgraded telephone numbers.

8. The terminal device according to claim 7, wherein the number upgrading unit is further configured to acquire the number upgrading rules from the network side by accessing a cloud through the wireless terminal or through a Subscriber Identity Module Card Took Kit (STK).

9. The terminal device according to claim 8, the program units further comprise:
  a number backup unit, configured to back up the acquired telephone numbers, wherein a backup file of the telephone numbers is named after backup time and a storage position of the backup file.

10. The terminal device according to claim 8, the program units further comprise:
  a number searching unit, configured to search for a corresponding backup file according to the backup time; and
  a number recovery unit, configured to delete the telephone numbers in the corresponding storage positions and cover the telephone numbers in the storage positions with the telephone numbers in the found backup file through the number writing unit.

* * * * *